US011063916B1

(12) United States Patent
Ferreira

(10) Patent No.: US 11,063,916 B1
(45) Date of Patent: Jul. 13, 2021

(54) FACILITY CONTROL SERVICE

(71) Applicant: Amazon Technologies, Inc., Seattle, WA (US)

(72) Inventor: Adolfo Bravo Ferreira, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 15/666,491

(22) Filed: Aug. 1, 2017

(51) Int. Cl.
H04L 29/06 (2006.01)
G05B 19/042 (2006.01)

(52) U.S. Cl.
CPC ...... H04L 63/0428 (2013.01); G05B 19/0426 (2013.01); G05B 2219/15028 (2013.01)

(58) Field of Classification Search
CPC ............ H04L 63/0428; G05B 19/0426; G05B 2219/15028
See application file for complete search history.

(56) References Cited

U.S. PATENT DOCUMENTS

| 8,769,691 | B1 | | 7/2014 | Hsueh et al. | |
|---|---|---|---|---|---|
| 9,508,347 | B2 | | 11/2016 | Wang et al. | |
| 9,563,854 | B2 | | 2/2017 | Cruz Mota et al. | |
| 10,298,394 | B2 | * | 5/2019 | Rhelimi | H04L 9/0833 |
| 2002/0056044 | A1 | * | 5/2002 | Andersson | H04L 63/0428 |
| | | | | | 713/189 |
| 2005/0210263 | A1 | * | 9/2005 | Levas | H04L 9/3271 |
| | | | | | 713/182 |
| 2006/0221996 | A1 | * | 10/2006 | de Froment | H04W 12/06 |
| | | | | | 370/463 |
| 2010/0262269 | A1 | | 10/2010 | Gladwin et al. | |
| 2014/0115166 | A1 | | 4/2014 | Kucharczyk et al. | |
| 2014/0187203 | A1 | * | 7/2014 | Bombacino | H04W 12/033 |
| | | | | | 455/411 |
| 2015/0081043 | A1 | * | 3/2015 | Kim | G05B 15/02 |
| | | | | | 700/19 |
| 2016/0014008 | A1 | | 1/2016 | Metts et al. | |
| 2016/0067864 | A1 | | 3/2016 | Metts et al. | |
| 2016/0182629 | A1 | | 6/2016 | Korn | |
| 2016/0217387 | A1 | | 7/2016 | Okanohara et al. | |
| 2016/0239749 | A1 | | 8/2016 | Peredriy et al. | |
| 2016/0337322 | A1 | * | 11/2016 | Kang | H04L 63/08 |

(Continued)

OTHER PUBLICATIONS

U.S. Appl. No. 15/660,857, filed Jul. 26, 2017, Kasaragod, et al.

(Continued)

Primary Examiner — Yonas A Bayou
(74) Attorney, Agent, or Firm — Robert C. Kowert; Kowert, Hood, Munyon, Rankin & Goetzel, P.C.

(57) ABSTRACT

A facility control service and programmable logic controller (PLC) interfaces enable coordination and optimization of control of various PLCs that use various PLC specific protocols. The facility control service sends control commands formatted in accordance with a secure protocol and respective PLC interfaces convert the control commands into respective PLC specific protocols. In some embodiments, a facility control service employs machine learning techniques to optimize control of PLCs at a facility. Also, in some embodiments, a facility control service coordinates deployment of PLC software to various PLCs in one or more facilities that use various PLC specific protocols.

20 Claims, 11 Drawing Sheets

(56) References Cited

U.S. PATENT DOCUMENTS

| | | |
|---|---|---|
| 2016/0358095 A1 | 12/2016 | Dong et al. |
| 2017/0034700 A1 | 2/2017 | Cohen et al. |
| 2017/0078875 A1 | 3/2017 | Muhanna et al. |
| 2018/0083982 A1* | 3/2018 | Asenjo .................... H04L 63/10 |
| 2018/0088541 A1* | 3/2018 | Sangi ...................... H04L 67/42 |
| 2018/0198764 A1* | 7/2018 | Kumar .................. H04L 9/0838 |
| 2018/0270067 A1* | 9/2018 | Woo .......................... H04L 9/32 |
| 2018/0316681 A1* | 11/2018 | Frahim .................. H04L 63/20 |
| 2018/0373218 A1* | 12/2018 | Wang ........................ G06F 8/51 |

OTHER PUBLICATIONS

U.S. Appl. No. 15/660,859, filed Jul. 26, 2017, Kasaragod, et al.
U.S. Appl. No. 15/635,148, filed Jun. 27, 2017, Aran Khanna.
U.S. Appl. No. 15/635,144, filed Jun. 27, 2017, Aran Khanna.
U.S. Appl. No. 15/635,147, filed Jun. 27, 2017, Aran Khanna.
U.S. Appl. No. 15/466,744, filed Mar. 22, 2017, Timothy Mattison.

\* cited by examiner

FACILITY CONTROL SERVICE

BACKGROUND

With the increased availability of smart devices that access the internet, many new applications have been developed that leverage internet connectivity. The Internet of Things (IoT) is a phrase given for the interconnection of smart devices with network accessible computing components within the existing internet infrastructure. IoT devices may be embedded in a variety of products, such as home appliances, manufacturing devices, printers, automobiles, thermostats, smart traffic lights, various types of sensors, etc. Many IoT devices make use of a connection with a server of a remote service provider in order to send data from the server to the IoT device and from the IoT device to the server.

In some cases, IoT devices may be used to provide data regarding conditions in a facility, such as temperature conditions, power usage conditions, manufacturing equipment conditions, etc. to a remote service. However, many such facilities include systems that are controlled by programmable logic controllers (PLCs) that utilize vendor specific and/or non-uniform PLC control protocols that are incompatible with IoT communication protocols. Thus, while a remote service, such as an IoT service, may be able to collect data regarding conditions in a facility from IoT devices in the facility, the remote service may not be able to automatically affect control changes for such systems at the facility via the PLCs that control the systems at the facility. For example, a technician may be required to manually re-program PLC set-points using a PLC vendor specific interface in response to a recommendation from a remote service.

Figure 1:
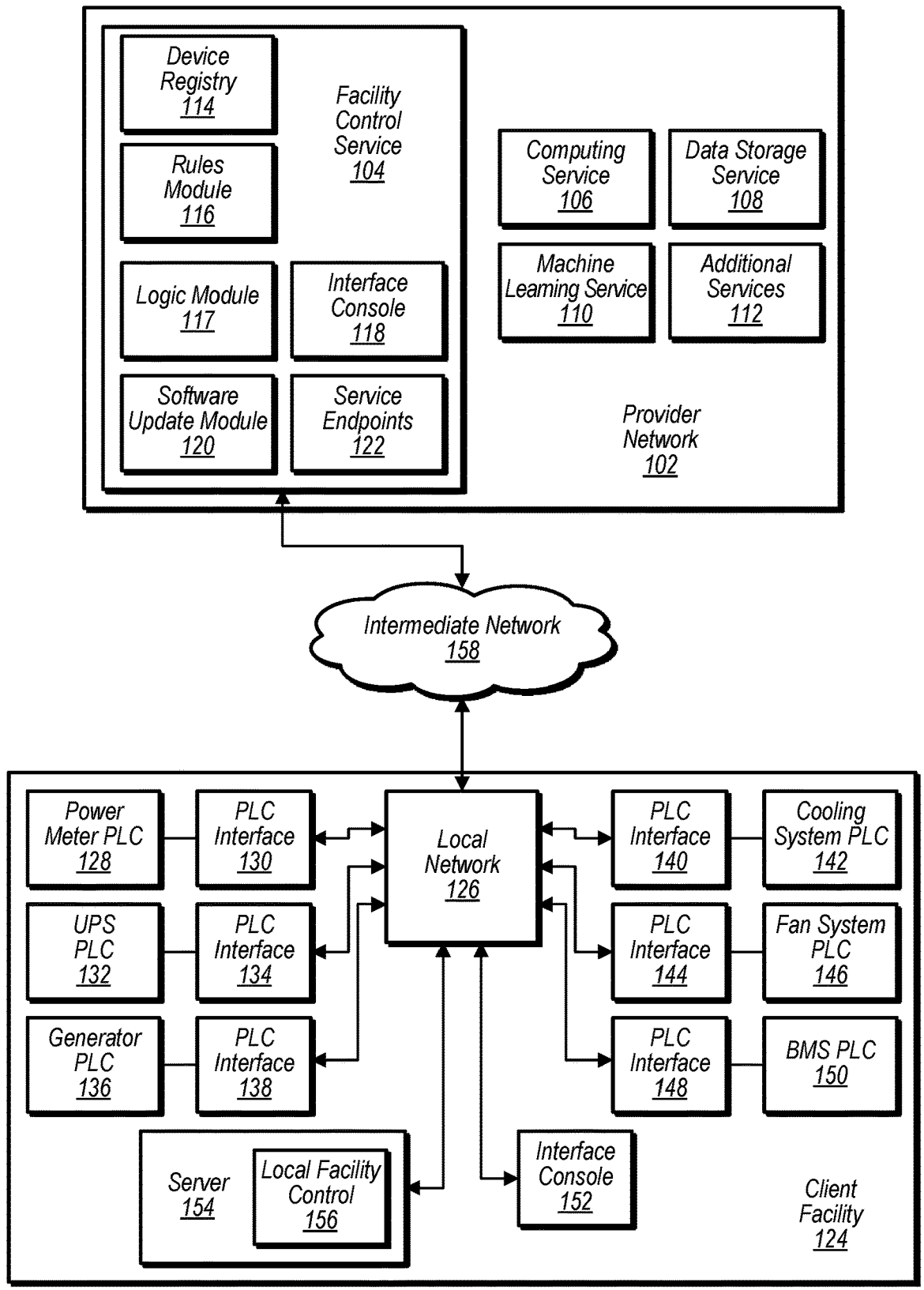
FIG. 1 illustrates a provider network that offers multiple services including a facility control service and FIG. 1 illustrates a client facility with PLCs controlled by the facility control service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement a facility control service for controlling systems at a facility that include, or are controlled by, programmable logic controllers (PLCs). In some embodiments, a facility control service includes one or more computers configured to establish an encrypted connection with a programmable logic controller (PLC) interface in accordance with a secure communication protocol, wherein the PLC interface is associated with a particular PLC at a facility and wherein the particular PLC controls a system at the facility. For example, in some embodiments, a PLC interface may be implemented on a computing device connected between a PLC at a facility and a facility control service. In other embodiments, a PLC interface may be implemented on a same computing device as a computing device that implements a PLC at a facility. Also, in some embodiments, a facility control service may be included in a facility with systems that are being controlled by the facility control service, or may be a remote service that is remote from a facility with systems controlled by the facility control service. Also, in some embodiments, a service provider may provide facility control services via a facility control service to clients of the service provider wherein the facility control services are used for controlling systems at the client's facilities that are separate from a facility that includes the one or more computers implementing the facility control service. The one or more computers of the facility control service are further configured to receive data indicating a condition at the facility. For example, in some embodiments, a facility control service may receive data indicating a condition at a facility via a secure connection between the facility control service and a PLC interface or may receive data from other sources, such as IoT devices at the facility, data for the facility stored by another service of a service provider that operates the facility control service, or from other sources. The one or more computers of the facility control service are also configured to generate a control command, based, at least in part, on the received data, wherein the control command comprises a command to adjust a control parameter of the PLC that controls the system at the facility. The one or more computers of the facility control service are also configured to cause the control command to be transmitted to the PLC interface in accordance with the secure communication protocol via the encrypted connection. The PLC interface receives the control command formatted in accordance with the secure protocol and converts the control command into a control command in accordance with a PLC protocol in use by the PLC, wherein the converted control command causes the PLC to make an adjustment to the control parameter of the PLC. In some embodiments, a facility control service may generate and transmit control commands to multiple different PLC interfaces for multiple different PLCs, wherein different ones of the PLCs operate using different PLC protocols. In some embodiments, PLCs operating according to different PLC protocols may be located at the same facility or at different facilities serviced by the facility control service. In some embodiments, the respective PLC interfaces associated with the different PLCs may receive control commands formatted in accordance with a common secure communication protocol used by the facility control service and convert the control commands into respective control commands in accordance with PLC protocols in use by respective ones of the PLCs with which the respective PLC interfaces are associated.

According to some embodiments, a method includes establishing a secure connection between a control service and a programmable logic controller (PLC) interface in accordance with a secure communication protocol, wherein the PLC interface is associated with a PLC at a facility; generating a command to adjust or update a parameter of the PLC at the facility; and transmitting the command from the control service to the PLC interface in accordance with the secure communication protocol via the encrypted connection.

According to some embodiments, a non-transitory computer readable storage medium stores program instructions that when executed on a processor, cause the processor to receive, from a control service, a command formatted in accordance with a secure protocol; convert the command into a command in accordance with a PLC protocol in use by a PLC; and cause the converted command to be transmitted to the PLC, wherein the converted command causes the PLC to adjust or update a parameter of the PLC. In some embodiments, the non-transitory computer readable storage medium storing the program instructions may be included in a PLC interface device that connects between a PLC and a control service. Also, in some embodiments, the non-transitory computer readable storage medium storing the program instructions may be included in a computing device upon which the PLC is implemented. For example, program instructions for implementing a PLC interface may be uploaded to a PLC computing device. In other embodiments, the non-transitory computer readable storage medium storing the program instructions may be other types of storage media, such as hard drives, discs, flash drives, etc. For example, the storage medium may be a medium used to store the program instructions prior to uploading the program instructions on a computing device that implements a PLC interface.

Many facilities, such as manufacturing facilities, commercial facilities, data center facilities, power facilities, and other types of facilities, include programmable logic controllers (PLCs) that control one or systems at the facilities. For example, a building HVAC system may be controlled by one or more PLCs or equipment of a manufacturing facility may be controlled by one or more PLCs. Due to the variety of manufacturers, the variety of uses of PLCs, and the age of many in-service PLCs, there are a variety of PLC protocols in use by different PLCs currently in use or that may be put in use. Also, many PLCs were and are designed to be independent control systems that are not connected to the internet. Thus, for many facility operators, interactions with a PLC at a facility may require a high-level of specialized skills in order to understand how to interact with the PLC using a specific PLC protocol or a vendor specific PLC interface. Also, performing control changes and software updates on a PLC may require physical interactions with the PLC by a technician in order to affect a change in an operating parameter of the PLC, such as a control setting or a software update. Also, software updates and software patches often require specialized programs and procedures that are specific to a particular PLC that uses a vendor specific PLC protocol. For example, each different PLC vendor may require a different vendor specific interface to effectuate software updates to a PLC manufactured by the vendor.

In addition, for facility operators that operate facilities that include multiple PLCs, the variety of PLC protocols in use by various PLCs and the requirement of physically interacting with a PLC to affect a change in an operating parameter of the PLC, may further complicate a process of updating control parameters and/or software in a fleet of PLCs in facilities operated by the facility operator.

Moreover, many facility operators, such as building owners, manufacturing facility operators, power facility operators, etc. lack resources to perform sophisticated control analysis at a given facility where a PLC is located beyond the capabilities of the PLC included in the facility operated by the facility operator. For example, a facility may not include sufficient spare computing capacity to implement sophisticated control analysis that requires large amounts of computing power.

In some embodiments of a facility control service, facilities that include one or more systems controlled by one or more PLCs may connect to a facility control service to coordinate control of the one or more PLCs included in the facilities. In some embodiments, a facility control service, may offer more sophisticated control analysis than is supported by PLCs included in facilities that are to be connected to the facility control service. For example, in some embodiments, a facility control service may include or be in communication with a machine learning service. A machine learning service may employ various machine learning techniques, such as decision tree learning, association rule learning, artificial neural networks, inductive logic programming, support vector machines, clustering, reinforcement learning, representation learning, similarity and metric learning, sparse dictionary learning, genetic algorithms, and the like to improve and optimize control of systems in facilities that are controlled by PLCs that are connected to a facility control service via respective PLC interfaces.

In addition, in some embodiments, a facility control service may coordinate control of systems controlled by separate PLCs either in the same facility or in different facilities. For example, for a given facility including a cooling system controlled by a first PLC and an exhaust fan controlled by a second PLC, a facility control service may coordinate control between the first and second PLCs such that the control of the exhaust fan complements the control of the cooling system.

Furthermore, in some embodiments, a facility control service may be used to cause a PLC software update or software patch to be installed on a given PLC. Also, a facility control service may coordinate a staged implementation of PLC software updates or software patches across a fleet of PLCs at a single facility or across multiple facilities. In addition, a facility control service may coordinate software updates for PLC interfaces associated with PLCs, wherein the PLC interfaces connect with the facility control service and convert control commands from the facility control service into respective local PLC protocols.

In some embodiments, a facility control service may establish a secure connection with a PLC interface at a remote facility to enable a PLC at the facility to receive control commands, PLC software updates, PLC software patches, PLC interface software updates and the like from the facility control service. In some embodiments, a PLC interface may be a physical device that is connected to a PLC and a network connected to a facility control service. For example, in some embodiments, a customer of a facility control service may receive or otherwise obtain a PLC interface device to connect to the customer's PLC to enable the customer's PLC to receive control commands from a facility control service. In some embodiments, a PLC at a facility may be configured to implement a PLC interface on a same or related computing device as a computing device that implements the PLC. In such embodiments, a customer may receive software from a facility control service or other source and configure a computing device implementing a PLC at the customer's facility to also implement a PLC interface for the PLC. For example, in some embodiments a customer of a facility control service may download PLC interface software from a facility control service and install the PLC interface software on the customer's PLC to implement a PLC interface on the customer's PLC for the customer's PLC.

In some embodiments, a PLC interface that is implemented on a separate physical device may connect to a PLC via a USB, serial, or Ethernet connection. In some embodiments, a PLC interface may communicate with a PLC via a Remote Access Service (RAS) API. In some embodiments, other suitable connection interfaces and communication interfaces may be used.

In some embodiments, a PLC interface may receive control commands formatted in accordance with a secure communication protocol used by a facility control service and convert the control commands into a PLC specific PLC protocol in use by a local PLC for which the PLC interface acts as an interface to the facility control service. In some embodiments, a PLC interface may store conversion instructions for performing conversions between the secure protocol used by the facility control service and a variety of PLC protocols in use on a variety of commercially available PLCs. For example, in some embodiments, a PLC interface may be configured to convert control commands formatted in accordance with a facility control service protocol into control commands formatted in accordance with PLC protocols in use by several PLC vendors, such as Carel, Distech, Tridium (Linux or Android platforms), Siemens, Schneider Electric, Mitsubishi, Trend, and the like. In some embodiments, a PLC interface may store conversion instructions for performing conversions between a secure protocol used by a facility control service and a non-commercial, proprietary PLC protocol in use by a PLC at a customer facility.

In some embodiments, a PLC interface may be configured to add additional conversion instructions to a set of conversion instructions stored by the PLC interface. This may allow the PLC interface to perform PLC protocol conversions for other PLC protocols other than a set of PLC protocols initially supported by a set of PLC protocol conversion instructions initially stored on the PLC interface or included with the PLC interface.

In some embodiments, a facility control service may control PLCs at a same facility as a facility in which the facility control service is implemented. In some embodiments, an operator of the facility control service and an operator of PLCs controlled by the facility control service may be the same entity.

In some embodiments, a PLC interface may be configured to enable a PLC to communicate with other PLCs via other PLC interfaces. In some embodiments, a PLC interface may communicate with other PLC interfaces via a facility control service or may communicate with other PLC interfaces via a local network or wirelessly. For example, in some embodiments, a PLC interface may publish certain types of data to other PLC interfaces that are subscribed to receive those types of data from the PLC interface. Also, the PLC interface may subscribe to certain types of data being published by other PLC interfaces. In some embodiments, a PLC interface may publish data to and/or subscribe to receive data from, other types of devices, such as IoT devices at a facility. In some embodiments, a PLC interface may receive a certificate from a facility control service to use in authenticating communications with other PLC interfaces. In some embodiments, communications between PLC interfaces at a facility may be routed through a local facility control. In some embodiments, the local facility control may function as a firewall that prevents non-authorized communications from being sent to and received from PLC interfaces not authorized to send or receive the communications. In some embodiments, a facility control service may coordinate with a local facility control to configure a firewall for communications between PLC interfaces, IoT devices, etc.

In some embodiments, a PLC interface may utilize a secure protocol such as the MQTT protocol to send various commands and/or data to and from other devices such as a local control service, other PLC interfaces, or IoT devices. For example, MQTT may be used to send control commands between PLCs via respective PLC interfaces or may be used to share facility condition information, such as temperature, voltage, current, etc., between PLCs via respective PLC interfaces. In some embodiments, MQTT may be used to share facility condition information with a local computing device, such as a server, and receive control commands from the local computing device.

In some embodiments, a local computing device, such as a server, may be configured to send and receive data with multiple PLCs via respective PLC interfaces. The local computing device may function as a shadow control system and provide uninterrupted control when a connection to a facility control service is lost. For example, a facility control service may perform advanced analysis beyond the capabilities of a local computing device, such as a server. However, the local computing device may be configured to continue a current control scheme "as is" with only minimal optimization while a connection with a facility control service is lost. Once a connection to a facility control service is resumed, the facility control service may resume control of PLCs connected to the facility control service via respective PLC interfaces and may perform more sophisticated optimization analysis, such as via machine learning techniques, than is possible using a local computing device.

In some embodiments, a facility control service may provide an interface console for receiving control inputs and software inputs from clients of a facility control service. For example, a facility control service may include or implement an application programming interface (API) or web-based interface via which control inputs and software updates may be submitted to the facility control service. For example, a customer may desire to shut-down one or more systems at a facility and may submit a shutdown control input via a web-based interface to a facility control service. In response, the facility control service may cause PLCs associated with the systems that are to be shut down to cause the systems to shut down. Also, the facility control service may further adjust a control scheme for remaining systems that are not shut down in response to the particular systems being shut down. As another example, a software input may be uploaded to a facility control service via an interface console. For example, a customer of a facility control service may receive a software patch from a particular PLC vendor. The customer may submit the software patch to a facility control service via an interface console, such as an API or a web-based interface. The facility control service may coordinate deployment of the software patch to all or some PLCs in the customer's fleet that utilize a PLC protocol that corresponds to a PLC protocol of the software patch. In some embodiments, a facility control service may automatically deploy software updates or software patches to a fleet of PLCs utilizing a common vendor PLC protocol in a staged manner. In some embodiments, a customer of a facility control service may submit one or more deployment instructions for deploying a software update or software patch to a fleet of PLCs connected to the facility control service via an interface console to direct how a staged deployment of the software update or software patch is to be performed.

FIG. 1 illustrates a provider network that offers multiple services including a facility control service and also illustrates a client facility with PLCs controlled by the facility control service, according to some embodiments.

Provider network 102 includes facility control service 104, computing service 106, data storage service 108, machine learning service 110, and one or more additional services 112. In some embodiments, a facility control service, such as facility control service 104, may coordinate with and/or utilize resources of other services of a provider network, such as provider network 102. For example, in some embodiments, a facility control service may store received data in a data storage service, such as data storage service 108, and may utilize computing resources of a computing service, such as computing service 106. Also, in some embodiments, a facility control service may include machine learning capabilities, or may coordinate with a separate machine learning service, such as machine learning service 110. For example, a facility control service may store received data in a data storage service, such as data storage service 108, and a machine learning service, such as machine learning service 110, may analyze the stored data to generate one or more control recommendations for a facility control service, such as facility control service 104. In some embodiments, a logic module of a facility control service, such as logic module 117 of facility control service 104, may receive one or more control recommendations from a machine learning service, such as machine learning service 110. The logic module of the facility control service may incorporate the one or more control recommendations received from the machine learning service into one or more rules or algorithms used to generate control commands for systems controlled by the facility control service. In some embodiments, a computing service, such as computing service 106, may include one or more computing resources allocated for use by a facility control service, such as facility control service 104. In some embodiments, a machine learning service may provide one or more control recommendations to computing resources of a computing service allocated for use by a facility control service, and the allocated computing resources may use the one or more control recommendations to generate one or more new or modified rules that are then provided to a facility control service and added to a logic module of the facility control service, such as logic module 117.

In some embodiments, a facility control service, such as facility control service 104, includes a device registry, such as device registry 114, a rules module, such as rules module 116, a logic module, such as logic module 117, an interface console, such as interface console 118, a software update module, such as software update module 120, and service endpoints, such as service endpoints 122.

In some embodiments, a facility control service, such as facility control service 104, may provide control services to a client facility such as client facility 124. Client facility 124 includes a local network 126 and several system PLCs connected to the local network via respective PLC interfaces. Local network 126 is also connected to a site server 154 and an interface console 152.

In some embodiments, a device registry, such as device registry 114, stores identification information and/or authentication information for PLC interfaces and/or other devices, such as other IoT devices, configured to communicate with a facility control service, such as facility control service 104. In some embodiments, a rules module, such as rules module 116, stores rules for routing communications between devices included in the device registry and components of the facility control service. For example a facility control service may receive, via an application-level network protocol (e.g., message queue telemetry transport (MQTT), hyper-text transfer protocol (HTTP), or any other application layer protocol used for internet or network communication), a network protocol message from a user device, such as a PLC interface or an IoT device. The network protocol message may include an identifier for the PLC interface or IoT device and/or an instruction for an IoT device. As used herein, an application level network protocol may be MQTT, HTTP, or any other application layer protocol suitable for internet or network communication and a network protocol message may be transmitted in accordance with any of the above application level network protocols. The facility control service, may then add the device identifier to the device registry. Also, the facility control service may route data from the PLC interface or IoT device to an appropriate portion of logic module 117 in accordance with rules stored in rules module 116. The facility control service may also route control commands from logic module 117 to the appropriate PLC interface via service endpoints 122 using rules stored in rules module 116. For example, facility control service 104 may provide facility control services for multiple PLC systems. A rules module may include rules for routing communications received from a particular PLC's PLC interface to an algorithm for controlling that PLC that is stored in logic module 117. The rules module may also include rules for routing a control command generated by logic module 117 in accordance with the algorithm corresponding with the particular PLC such that the control command is transmitted to the PLC interface associated with the particular PLC via service endpoints 122.

In some embodiments, a customer of a facility control service may provide a list of devices that are to be included in a device registry for a facility control service. For example a customer may provide a list of PLCs or PLC interfaces that are to be registered with a facility control service via an interface console, such as interface console 118. In some embodiments, a facility control service may not add devices to a device registry if the devices are not included in a list of devices to be registered with the facility control service. For example, if a PLC interface from an unrelated facility attempted to register with a facility control service the registration may be denied. In some embodiments, one or more other criteria, in addition to or in place of a list of devices may be used by a facility control service to determine whether to add a device, such as an IoT device or a PLC interface to a device registry, such as device registry 114.

In some embodiments, a device registry, such as device registry 114 and/or service endpoints 122 may cause certificates to be issue to registered devices for use in authenticating the devices with the facility control service and/or authenticating the devices with other devices. For example, a facility control service may provide a certificate to a PLC interface and the PLC interface may use the certificate to authenticate its identity when establishing a secure connection with a facility control service or when communicating with other PLC interfaces. For example, PLC interface 130 in client facility 124 may receive a certificate from facility control service 104 as part of establishing a secure connection between service endpoints 122 of facility control service 104 and PLC interface 130. A PLC interface, such as PLC interface 130, may then use the certificate for authentication when exchanging information with other devices at the client facility, such as any of PLC interfaces 130, 134, 138, 140, 144, or 148. In some embodiments, a PLC interface, such as PLC interface 130, may also exchange data with a local computing device, such as site server 154. A local computing device may be configured to continue a current control scheme "as is" with minimal optimization while a connection with a facility control service is lost, for example local facility control 156 implemented on site server 154 may provide control functionality to PLC interfaces of PLCs included in client facility 124 when a network connection to facility control service 104 is lost. For example, a connection from client facility 124 to provider network 102 and/or facility control service 104 via intermediate network 158 may be temporarily unavailable. During such period of unavailability, local facility control 156 may provide at least some control functionality to PLCs included in client facility 124 via the respective PLC interfaces associated with each of the PLCs. Once a connection to a facility control service is resumed, the facility control service may resume control of PLCs connected to the facility control service via respective PLC interfaces and may perform more sophisticated optimization analysis than are performed on a local computing device.

In some embodiments, PLC interfaces in a facility may communicate with each other via a local facility control service, such as local facility control 156. In some embodiments, a local facility control service, such as local facility control 156, may function as a gateway between devices at the facility. For example, a local facility control service, such as local facility control 156, may store logic that controls which ones of PLC interfaces 130, 134, 138, 140, 144, 148, and interface console 152 can communicate with each other and what types of information may be exchanged.

In some embodiments, a client facility may also include a local interface console, such as a touch-screen, monitor, or other type of user interface that allows a user at the client facility to interact with a facility control service. For example, a user may request to shutdown, restart, or adjust settings for one or more PLCs at client facility 124 via interface console 152. In some embodiments, the interface console may appear to the facility control service as a connected IoT device.

In some embodiments, a logic module of a facility control service, such as logic module 117, may store and/or execute one or more rules that implement a control strategy or control algorithm for controlling client devices such as any of the PLC controlled systems included in client facility 124. For example, a logic module, such as logic module 117, may store and/or execute rules that implement control algorithms for controlling power meter PLC 128, uninterruptible power supply (UPS) PLC 132, generator PLC 136, cooling system PLC 142, fan system PLC 146, and building management system (BMS) PLC 150. Note that the types of systems controlled by PLCs illustrated in FIG. 1 are given only as examples of systems that may be controlled by a PLC that may utilize control services of a facility control service. In some embodiments, various other types of systems controlled by a PLC may utilize control services of a facility control service.

In some embodiments, a logic module of a facility control service may include processing capacity to execute rules or may utilize computing capacity of another service, such as computing service 106, to execute rules maintained by logic module 117 to generate control commands to be transmitted to PLC interfaces at client facility 124 via service endpoints 122.

In some embodiments, a secure protocol used by a facility control service, such as facility control service 104, may include both authentication and encryption. For example a gateway of a facility control service, such as service endpoints 122, may authenticate devices attempting to connect to a facility control service, such as PLC interface 130, and may also establish an encrypted connection between the device and the facility control service. For example, facility control service 104 may establish an encrypted connection between PLC interface 130 and service endpoints 122.

In some embodiments, a facility control service may generate control commands based on rules or logic included in a logic module, such as logic module 117, and may receive control recommendations from a machine learning service, such as machine learning service 110. In some embodiments, control recommendations may recommend adding new rules or logic to a logic module, removing rules or logic from a logic module, or modifying rules or logic included in a logic module. In some embodiments, rules or logic included in a logic module may be used to coordinate control between multiple systems controlled by different PLCs in a client facility. For example, in some embodiments a logic module may generate control commands for fan system PLC 146 that vary depending on a control command being generated for cooling system PLC 142. Thus a rule included in a logic module may coordinate operation of an exhaust fan with a cooling system, where the two systems are controlled by separate PLCs. In some embodiments, a rule included in a logic module may cause a control command to be generated based on other data. For example, a facility control service may be implemented in a same facility as a facility controlled by the facility control service.

In such a situation, hardware implementing provider network 102 may be included in client facility 124, and the facility control service 104 of provider network 102 may include rules that take into account current loads of services offered by the provider network, such as computing service 106, machine learning service 110, data storage service 108, and additional services 112. Thus in such situations, a rule included in a logic module of a facility control service, may in some embodiments, adjust control of systems controlled by PLCs based on loading of services, such as computing services, data storage services, etc.

In some embodiments, a facility control service may include a software update module, such as software update module 120. A software update module may allow software updates and software patches to be submitted to a facility control service for implementation on PLCs controlled by the facility control service. Furthermore, in some embodiments a software update module and/or an interface console may allow a customer to select how and when software updates or software patches are to be implemented on PLCs included in the customer's fleet of PLCs. For example, a customer may submit a software patch for PLC software for PLCs that operate using a certain vendor's PLC protocol. The customer may submit code for the software update or software patch to a software update module directly via an API or via a web-based interface, for example using interface console 118. Also, the customer may request a staged deployment of the software update or software patch and may specify details for the staged deployment. For example, a customer's fleet may include PLCs included in client facility 124 and of those PLCs a certain number of them may operate using a common vendor specific PLC protocol. For example, power meter PLC 128, UPS PLC 132, and generator PLC 136 may all operate using a Schneider Electric PLC protocol. The customer may submit a software patch for Schneider Electric PLC protocol PLCs via an interface console, such as interface console 118, and may specify that the software patch is to be implemented on power meter PLC 128 initially, and in response to power meter PLC 128 operating within predetermined parameters for a specified amount of time, for example 2 days without shutting down, then the software patch is to be deployed to UPS PLC 132 and generator PLC 136.

In some embodiments, a facility control service may include more or less elements than shown in FIG. 1. For example, in some embodiments, a facility control service may use a gateway of a provider network, such as provider network 102, and may not include a separate gateway, such as service endpoints 122. Also, in some embodiments various other components may be combined or added. For example in some embodiments, functionality of software update module 120 may be included in interface console 118 or logic module 117. In some embodiments, various other combinations of modules may be included in a facility control service.

Figure 2:
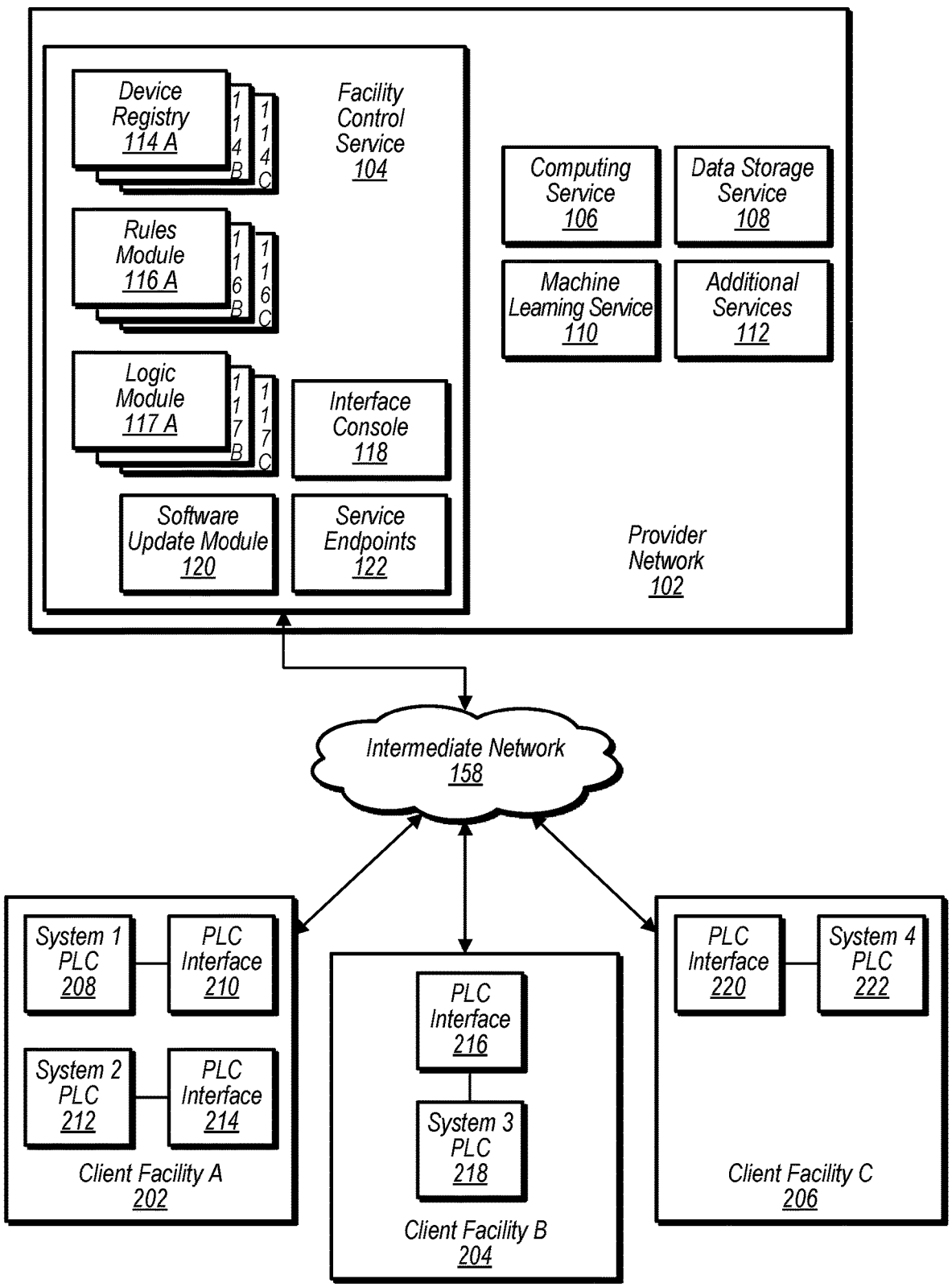
FIG. 2 illustrates a facility control service that controls systems at multiple facilities via PLC interfaces to PLCs at the multiple facilities, according to some embodiments.

FIG. 2 illustrates a facility control service that controls systems at multiple facilities via PLC interfaces to PLCs at the multiple facilities, according to some embodiments. Facility control service 104 included in provider network 102 illustrated in FIG. 2 may be the same facility control service 104 as discussed in regard to FIG. 1. Also, provider network 102 illustrated in FIG. 2 may offer similar services as the provider network 102 discussed in regard to FIG. 1.

In some embodiments, a facility control service, such as facility control service 104, may provide facility control services to multiple customers. For example, in some embodiments, client facility A 202, client facility B 204, and client facility C 206, may each be facilities operated by different customers of facility control service 104. Client facility A 202 includes System 1 PLC 208 and corresponding PLC interface 210 and System 2 PLC 212 and corresponding PLC interface 214. Client facility B 204 includes System 3 PLC 218 and corresponding PLC interface 216. Client facility C 206 includes System 4 PLC 222 and PLC interface 220. In some embodiments, a facility control service may maintain separate device registries rules modules, and logic modules for separate customers. For example, logic module 117 A may include logic for controlling PLCs at client facility A 202 and logic modules 117 B and 117 C may include logic for controlling PLCs at client facilities B 204 and C 206, respectively. Also, for example, device registry 114 A may include registered devices included in client facility A 202 and device registries 114 B and 114 C may include registered devices included in client facilities B 204 and C 206, respectively. Also, for example, rules module 116 A may include rules for routing communications to and from devices included in client facility A 202 and rules modules 116 B and 116 C may include rules for routing communications to and from devices included in client facilities B 204 and C 206, respectively. In some embodiments, other components of a facility control service, such as interface console 118, software update module 120, and service endpoints 122, may support multiple client accounts, such as for clients A, B, and C that operate client facilities A 202, B 204, and C 206, respectively. In some embodiments, multiple clients may be supported using a common rules module, a common device registry, and/or a common logic module. In some embodiments, different sets of device registries, rules modules, and logic modules may support different regions that each include multiple facilities.

In some embodiments, a customer of a facility control service may operate multiple facilities. For example, in some embodiments a customer with a client account with a facility control service may operate client facility A 202, client facility B 204, and client facility C 206. In some embodiments, PLCs that control systems that are operated by a same customer of a facility control service may include PLCs that use different vendor specific PLC protocols. For example, system 1 PLC 208, system 2 PLC 212, system 3 PLC 216, and system 4 PLC 222 may use different vendor PLC protocols even though all four PLCs are operated by a same customer of the facility control service. In such a situation, the customer of the facility control service may coordinate deploying software updates or software patches on PLCs that use the same vendor PLC protocols using a software update module of a facility control service, such as software update module 120 of facility control service 104. For example, system 1 PLC 208, system 3 PLC 216, and system 4 PLC 222 may operate using a "Carel" vendor specific PLC protocol, while system 2 PLC 212 may use a different vendor PLC protocol, such as a "Distech" PLC protocol. The customer may submit a software patch for Carel PLC protocol machines via interface console 118 and software update module 120 may coordinate deploying the Carel PLC protocol patch on system 1 PLC 208, system 3 PLC 216, and system 4 PLC 222, but not system 2 PLC 212, which does not use a Carel PLC protocol, for example. Thus the customer, may no longer have to maintain current Carel and Distech PLC interface software and may instead rely on the facility control service 104 to perform software updates and software patches to the PLCs included in the customer's fleet.

Figure 3:
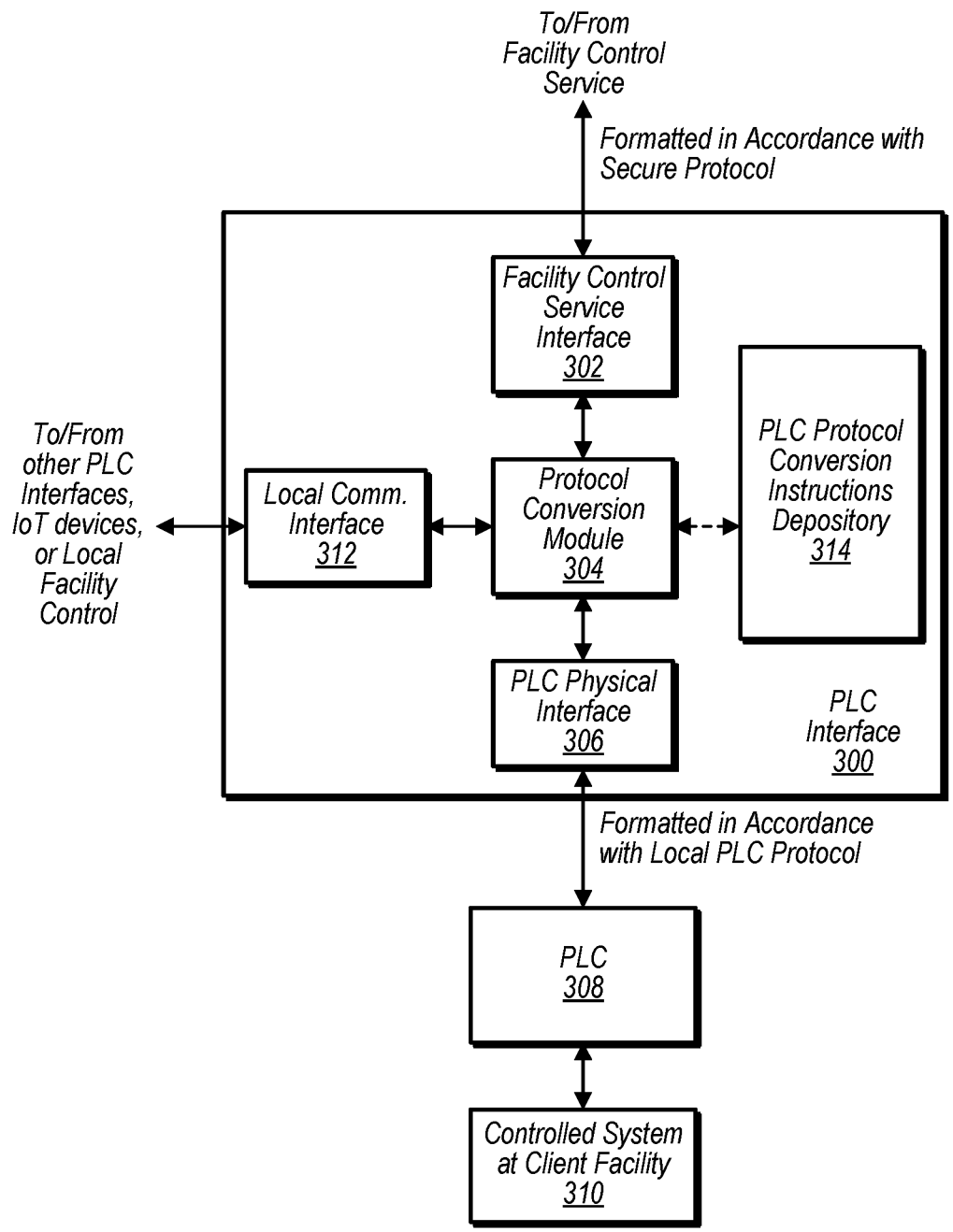
FIG. 3 illustrates a PLC interface device/module, according to some embodiments.

FIG. 3 illustrates a PLC interface device or module, according to some embodiments. PLC interface device/module 300 may be any of the PLC interfaces described in FIGS. 1-2 and 4-10. In some embodiments, a PLC interface 300 may comprise program instructions that are implemented on a client's computing device, such as a computing device that implements a PLC or may comprise a physical device, such as a computing device that stores program instructions that when executed by a processor of the computing device implement a PLC interface. For simplicity, all references to a "PLC interface" herein may be references to a physical PLC interface device, or references to a PLC module that includes program instructions that may be stored on a plurality of non-transitory computer readable storage mediums.

In some embodiments, a PLC interface, such as PLC interface 300 includes a facility control service interface, such as facility control service interface 302, a PLC physical interface, such as PLC physical interface 306, a local communication interface, such as local communication interface 312, a protocol conversion module, such as protocol conversion module 304, and a PLC protocol conversion instructions depository, such as PLC conversion instructions depository 314. Facility control service interface 302 may be one of a variety of suitable interfaces configured to connect to a network, such as the internet, a local network, etc. Also, PLC physical interface 306 may be one of a variety of suitable interfaces configured to connect to a PLC, such as a USB connector, a serial connector, an Ethernet connector, and the like.

In some embodiments, a PLC protocol conversion instruction depository, such as PLC conversion instructions depository 314, may include one or more sets of instructions for converting commands received in accordance with a secure protocol used by a facility control service into a PLC specific protocol in use by a PLC to which the PLC interface is connected. For example, PLC interface 300 may be connected to a PLC that uses a "Carel" vendor specific PLC protocol. In such a case, PLC protocol conversion instructions 314 may include a set of instructions for converting control commands received from a facility control service in accordance with a secure protocol used by the facility control service into control commands formatted in accordance with a "Carel" vendor specific PLC protocol that are formatted to cause the PLC connected to the PLC interface 300 to make a control adjustment.

In some embodiments, a PLC interface, such as PLC interface 300, may receive control commands formatted in a first protocol via facility control service interface 302 and protocol conversion module 304 may convert the control commands into control commands formatted in accordance with a second protocol by applying PLC protocol conversion instructions from PLC protocol conversion instructions directory 314. The converted control commands may be transmitted to an attached PLC via PLC physical interface 306. In some embodiments, PLC physical interface 306 may by omitted and an API interface, such as a RAS API, may provide a logical interface. The converted control commands may cause a PLC using a particular PLC protocol to change a control parameter of the PLC's control of a system at the facility. For example, the converted control commands may cause PLC 308 to change a control parameter in regard to controlling system 310.

In some embodiments, a PLC interface, such as PLC interface 300 may also include a local communication interface, such as local communication interface 312. A local communication interface may allow a PLC interface (and by extension a connected PLC) to exchange data indicating a condition at the facility with other devices at the facility, such as other PLCs with PLC interfaces. Also, a local communication interface may allow a PLC interface (and by extension a connected PLC) to exchange control parameters with other devices at the facility, such as other PLCs with PLC interfaces. In some embodiments, a local communication interface may utilize a secure protocol such as the MQTT protocol to send various commands and/or data to and from other devices such as other PLC interfaces or IoT devices. For example, MQTT may be used to send control commands between PLCs via respective PLC interfaces or may be used to share facility condition information, such as temperature, voltage, current, etc., between PLCs via respective PLC interfaces. In some embodiments, MQTT may be used to share facility condition information with a local computing device, such as a site server, and receive control commands from the local computing device. In some embodiments, communications between PLC interfaces and/or between PLC interfaces and other devices may be routed through a local computing device implementing a local facility control, wherein the local facility control functions as a gateway between the PLC interfaces.

Figure 4:
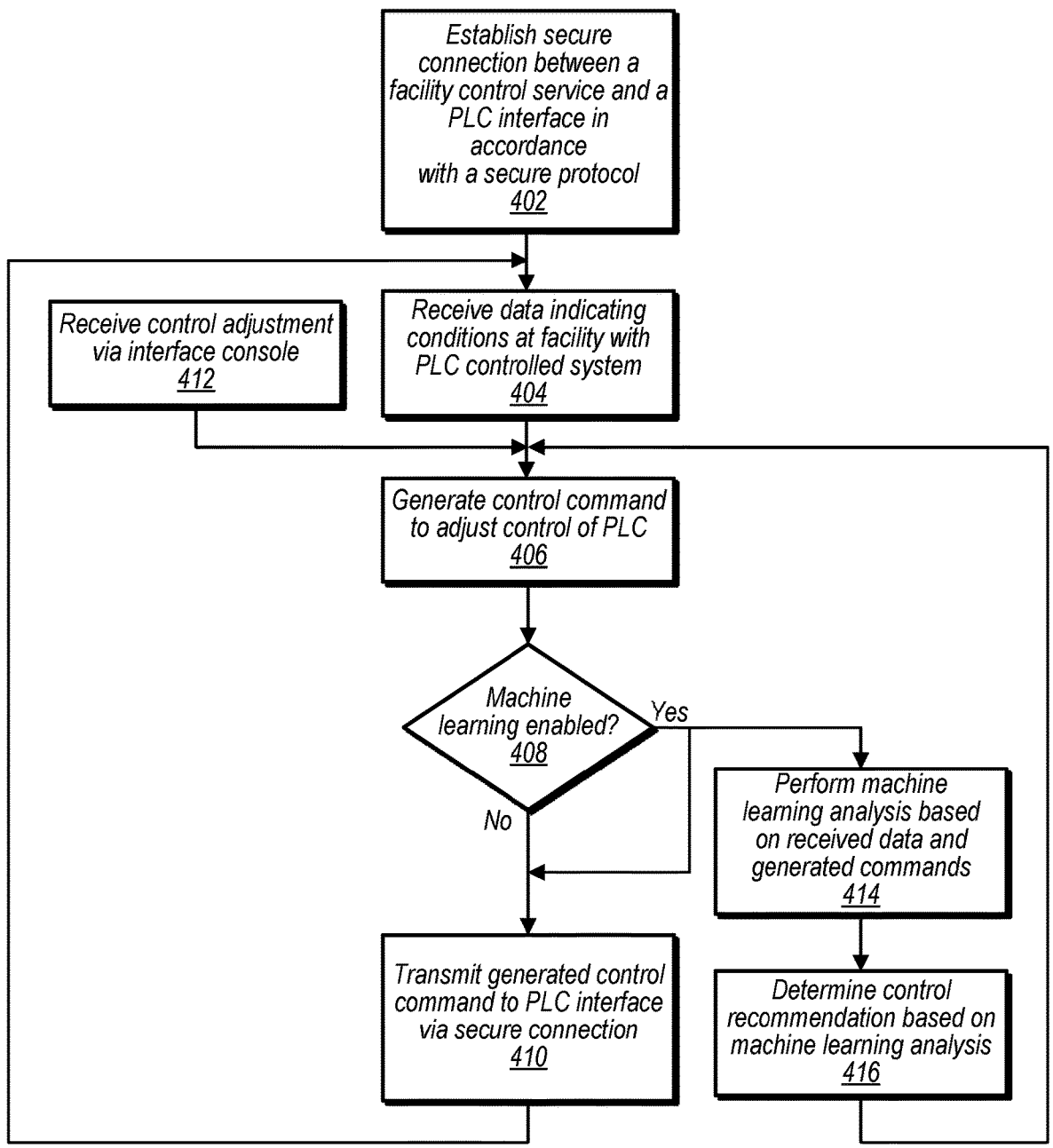
FIG. 4 is a logical block diagram illustrating operations performed by a facility control service, according to some embodiments.

FIG. 4 is a logical block diagram illustrating operations performed by a facility control service, according to some embodiments.

At 402 a facility control service establishes a secure connection with a PLC interface device or a PLC interface module implemented on a PLC computing device. The secure connection is established in accordance with a secure communication protocol that includes authentication of an identity of the PLC interface, authentication of an identity of the facility control service, and/or encryption between the PLC interface and the facility control service. The secure protocol prevents unauthorized entities from attempting to control systems at a facility via PLC interfaces at the facility. The secure protocol also prevents unauthorized third parties from intercepting data about conditions at a facility.

At 404 the facility control service receives data indicating conditions at the facility. Data may be received via the established secure connection from the PLC interface, may be received from other devices at the facility that are configured to send data to the facility control service, or may be received from a machine learning service, amongst various other sources. At 406, the facility control service generates one or more control commands for adjusting a control parameter of a PLC controlled by the facility control service. At 410, the one or more generated or more control commands are transmitted to the connected PLC interface via the secure connection in accordance with the secure protocol, for example the one or more control commands may be encrypted when transmitted between the facility control service and the PLC interface. Also, at 408 it is determined whether or not machine learning is enabled for the facility control service. Note that regardless of whether or not machine learning is enabled, the one or more control commands generated at 406 are transmitted at 410. However, if machine learning is enabled, the generated control commands may also be sent to a machine learning service along with the data received at 404. In some embodiments, a machine learning service may be included in a facility control service or may be a separate service in a common provider network that includes both the facility control service and the machine learning service. In some embodiments, a facility control service may contract with a third-party machine learning service to provide machine learning services. In some embodiments, a facility control service and a machine learning service may exchange heartbeat messages to ensure the machine learning service is connected to the facility control service and receiving data and generated control commands. At 414 machine learning analysis is performed on the received data and generated control commands provided to the machine learning service. The machine learning service may determine at 416, one or more control recommendations based on the analyzed data and control commands. For example, a machine learning service may determine additional rules to be added to a logic module, changes to be made to rules included in a logic module, or rules that are to be deleted from a logic module, such as logic module 117 described in FIGS. 1 and 2.

In addition, in some embodiments, a facility control service may further receive control adjustments at 412 via an interface console, such as a web-based interface or an API. For example a control adjustment may be to change a set-point for a system, a command to restart a system, shut down a system, etc. At 406, a facility control service may further base the generation of the one or more control commands based on control adjustments received via an interface console, such as interface console 118 described in FIGS. 1 and 2.

Figure 5A:
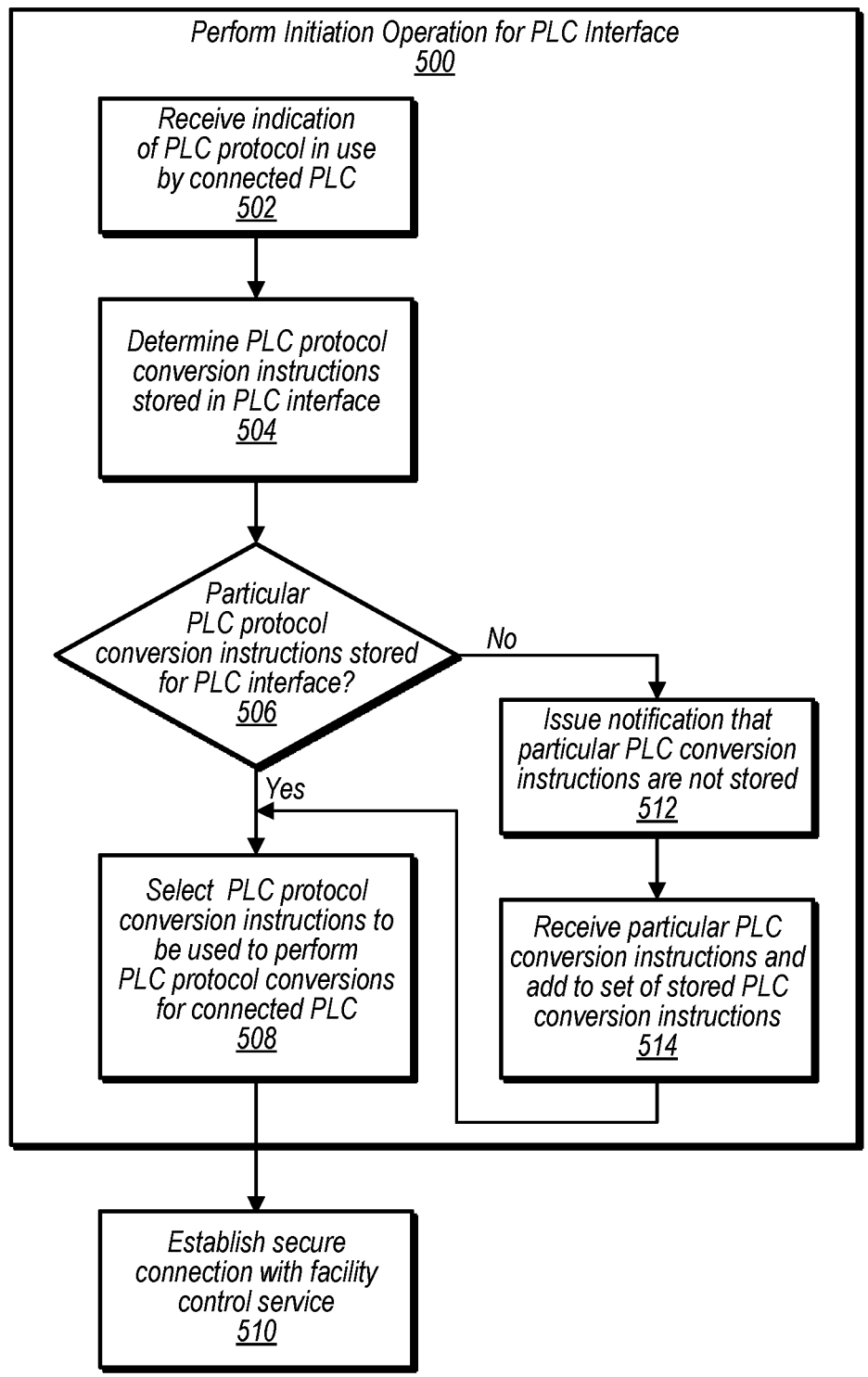
FIG. 5A is a logical block diagram illustrating installation operations performed by a PLC interface device/module, according to some embodiments.

FIG. 5A is a logical block diagram illustrating installation operations performed by a PLC interface device/module, according to some embodiments. At 500 an initiation operation is performed to initiate a PLC interface connected to or included in a particular PLC. The initiation includes at least steps 502, 504, 506, 508, 512, and 514.

At 502 the PLC interface connected to a particular PLC or implemented on a particular PLC receives an indication of a particular PLC protocol in use by the connected or associated PLC. At 504, the PLC interface determines what particular PLC protocols are included in a PLC protocol conversion instructions depository of the PLC interface. At 506 the PLC interface determines if PLC protocol conversion instructions are stored for the particular PLC protocol, if so the process continues at 508. If not, at 512, a notification is issued that PLC protocol conversion instructions are not stored for the particular PLC protocol in use by the connected PLC. Subsequently, at 514, the conversion instructions for the particular PLC protocol are provided to the PLC interface and added to the PLC protocol conversion instructions depository of the PLC interface. In some embodiments, the conversion instructions for the particular PLC protocol may be provided in a variety of manners. For example, a software update may be performed to obtain the conversion instructions for the particular PLC protocol or the conversion instructions for the particular PLC protocol may be downloaded from the facility control service. In some embodiments, a customer of a facility control service may submit information about the particular PLC connected to the PLC interface via an interface console of a facility control service to help the facility control service determine conversion instructions for the particular PLC protocol. In other embodiments, a PLC interface may obtain information about the particular PLC via a connection to the PLC and submit the information to the facility control service to help the facility control service determine the conversion instructions for the particular PLC protocol. In some embodiments, the conversion instructions for the particular PLC protocol may be manually loaded onto a PLC interface by connecting a device storing the conversion instructions for the particular PLC protocol to the PLC interface device or a computing device implementing a PLC interface module.

At 508, the particular PLC protocol conversion instructions for the particular PLC protocol in use by the connected PLC are selected to be used to perform PLC protocol conversions for the connected PLC.

At 510, a secure connection between the PLC interface and the facility control service is established in accordance with a secure protocol. In some embodiments, 510 may be performed prior to performing an initiation operation for the PLC interface, e.g. before performing 500. In some embodiments establishing a secure connection at 510 may include a facility control service provide a certificate to the PLC interface for the PLC interface to use in authenticating the PLC interface when communicating with the facility control service. In some embodiments, a PLC interface may be pre-configured for a particular PLC and step 500 may be omitted.

Figure 5B:
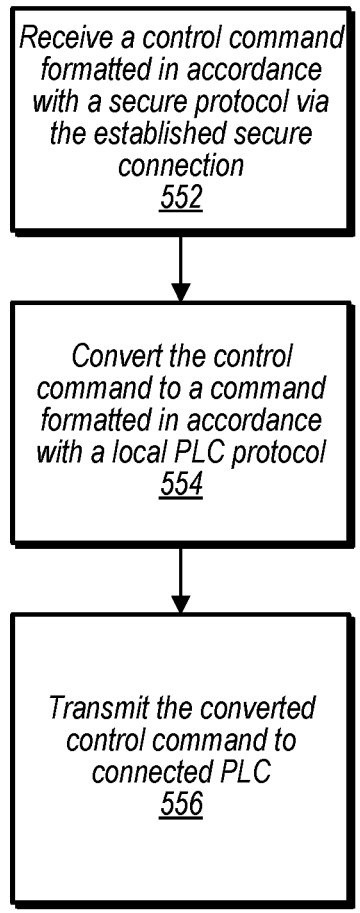
FIG. 5B is a logical block diagram illustrating operations performed by a PLC interface device/module when receiving a control command, according to some embodiments.

FIG. 5B is a logical block diagram illustrating operations performed by a PLC interface device/module when receiving a control command, according to some embodiments.

At 552, the PLC interface receives control commands from the facility control service formatted in accordance with the secure protocol in use by the facility control service via the secure connection.

At 554, the PLC interface converts the received control commands into control commands formatted in accordance with the particular PLC protocol in use by the PLC connected to the PLC interface. In some embodiments, converting the control commands from the secure protocol to the particular PLC protocol may further include decrypting encrypted control commands.

At 556, the converted control commands are transmitted to the PLC connected to the PLC interface. The connected PLC may then cause one or more adjustments to be made in the control of a system controlled by the PLC, based on the converted control commands.

Figure 5C:
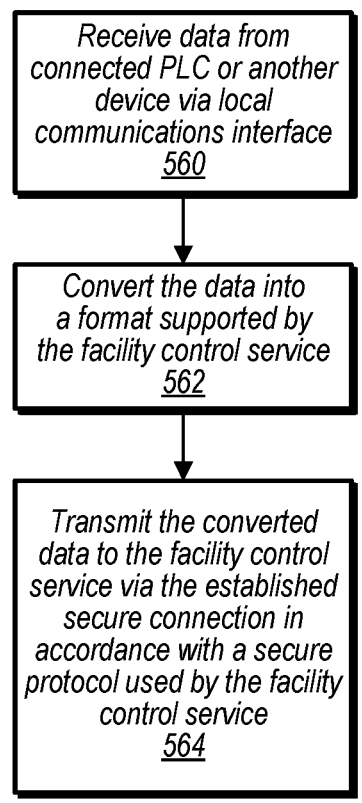
FIG. 5C is a logical block diagram illustrating operations performed by a PLC interface device/module when providing data to a facility control service, according to some embodiments.

FIG. 5C is a logical block diagram illustrating operations performed by a PLC interface device/module when providing data to a facility control service, according to some embodiments.

At 560, the PLC interface receives data from the PLC connected to the PLC interface, for example the PLC interface may receive sensor measurements generated by sensors that supply the sensor measurements to the PLC. Also, in some embodiments, the PLC interface may receive data via a local communications interface that subscribes to data published by other PLC interfaces at the facility, IoT devices at the facility, or data received from other types of devices. In some embodiments, communications between a PLC interface and other PLC interfaces at the facility, IoT devices at the facility, or data received from other types of devices may be routed through a local facility control service that functions as a firewall for the PLC interface.

At 562, the PLC interface converts the received data into a format supported by the facility control service. For example, the PLC interface may use one or more PLC protocol conversion instructions to convert the data from a particular PLC protocol in use by the PLC connected to the PLC interface into a format supported by the facility control service, such as the secure protocol. Furthermore, in some embodiments, the PLC interface may encrypt the received data at 562 before transmitting the encrypted data.

At 564, the converted data is transmitted to the facility control service via the established secure connection between the PLC interface and the facility control service. The converted data may be transmitted in accordance with the secure protocol that includes authentication and encryption.

Figure 6:
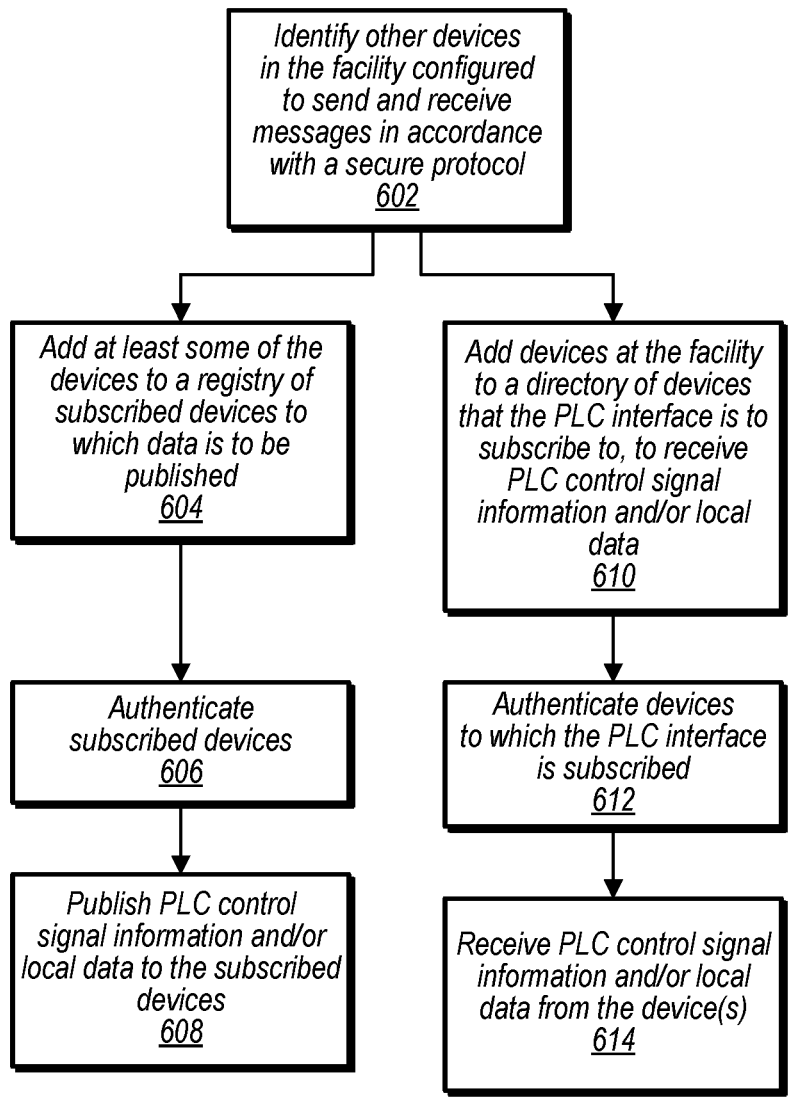
FIG. 6 is a logical block diagram illustrating operations performed by a PLC interface device/module to communicate with other PLC interfaces or devices at a facility, according to some embodiments.

FIG. 6 is a logical block diagram illustrating operations performed by a PLC interface device/module to communicate with other PLC interfaces at a facility, according to some embodiments.

At 602, a PLC interface identifies, via a local communication interface, other devices at a facility configured to send and/or receive messages in accordance with a secure protocol, such as MQTT. At 604 at least some of the devices are added to a registry of subscribed devices to which data from the PLC interface is to be published. In some embodiments, a facility control service may instruct a PLC interface which devices to publish data to. Also, in some embodiments, a customer may configure a PLC interface to publish data to particular devices by submitting instructions to a facility control service via a console interface of the facility control service.

At 606, the PLC interface authenticates identities of devices to which data is to be published from the PLC interface and, at 608, the PLC interface publishes the data to the subscribed authenticated devices. In some embodiments, different types of data may be subscribed to by different types of devices, thus subscribed devices may receive different types, amounts of data, etc. from a PLC interface.

At 610, the PLC interface adds devices at the facility to a directory of devices the PLC interface is subscribed to receive data from. The data that may be received from the other devices may be PLC control signal data from other PLCs with PLC interfaces that include a local communications interface and that are located at the facility. Local data from PLCs at the facility may also include data regarding sensed conditions or data from other devices at the facility, such as IoT devices.

At 612, the PLC interface authenticates respective identities of the devices that the PLC interface is to receive data from and at 614 the PLC interface receives data from the devices, such as PLC control signal information, and/or local data about conditions at the facility.

Figure 7:
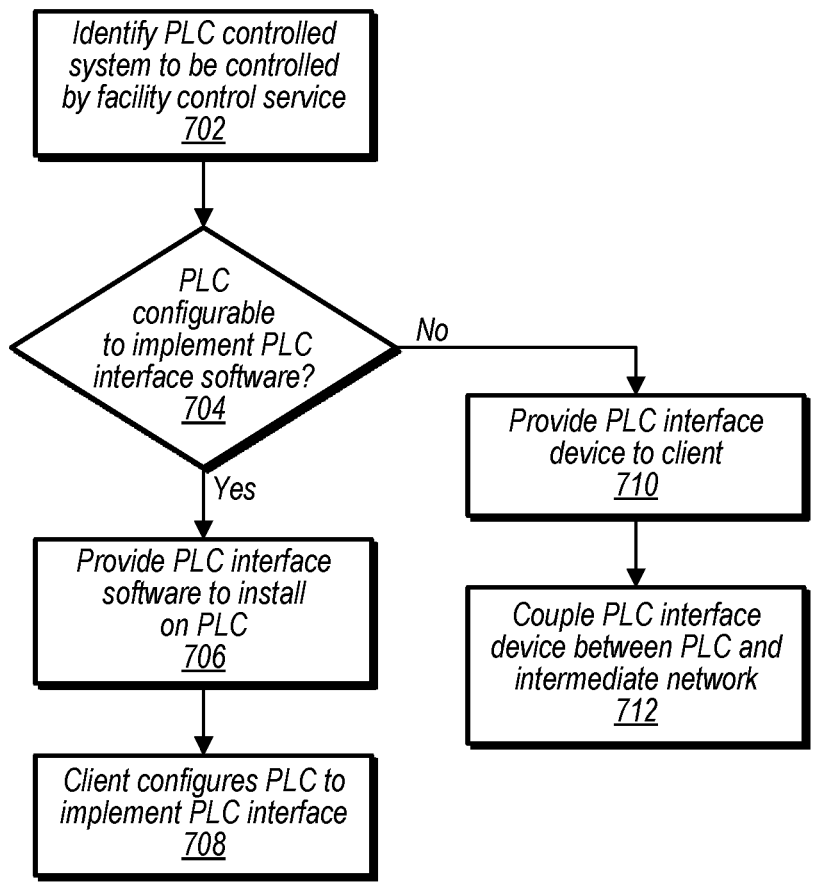
FIG. 7 is a logical block diagram illustrating a process for providing a PLC interface to a client, according to some embodiments.

FIG. 7 is a logical block diagram illustrating steps for providing a PLC interface for a PLC to a client of a facility control service, according to some embodiments.

In some embodiments, a facility control service may provide software for implementing a PLC interface or may ship PLC interface devices to customers of a facility control service to enable the customers to connect their PLCs to the facility control service and to enable the customer's PLCs to receive control commands from the facility control service.

At 702, a PLC system to be connected to the facility control service is identified. At 704 it is determined if the PLC system is configurable to implement a PLC interface that may be downloaded from a facility control service. In some embodiments, a computing device implementing a PLC system may not be configured to load additional software, or, in some embodiments, reconfiguring a computing device implementing a PLC to load additional software may void a warranty for the PLC. Thus, in some cases it may not be desirable to install PLC interface software directly on a computing device implementing a PLC. However, in some situations in which a computing device implementing a PLC is configurable to implement a PLC interface or in situations in which a client has another computing device configurable to implement a PLC interface, software for the PLC interface may be provided to the client at 706, for example by downloading the PLC interface software from a facility control service. At 708 the client configures the computing device implementing the PLC or another computing device to implement the PLC interface by loading the provided PLC interface software on the computing device implementing the PLC or on the other computing device. In the case of the other computing device, the other computing device may be coupled between the PLC and a network connected to the facility control service.

At 710, instead of downloading PLC interface software from the facility control service, an operator of the facility control service may cause a PLC interface device to be provided to the client of the facility control service. For example, a pre-configured PLC interface device may be shipped to the client. Also the client may purchase a PLC interface device from a store or obtain it from another party. At 712 the pre-configured PLC interface device is coupled between the client's PLC and an intermediate network that connects the client's facility to the facility control service.

Figure 8:
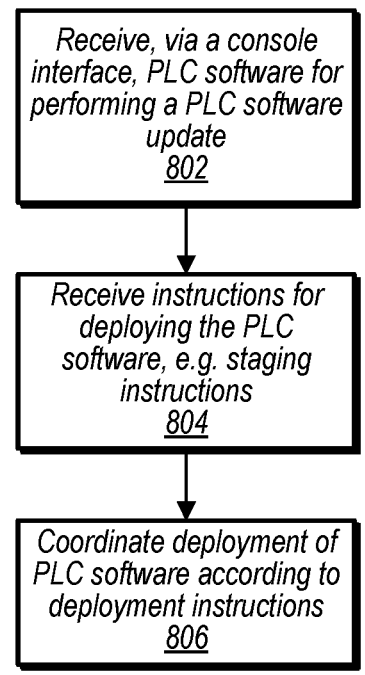
FIG. 8 is a logical block diagram illustrating operations for performing a software update on a PLC via a PLC interface, according to some embodiments.

FIG. 8 is a logical block diagram illustrating operations to perform a software update on a PLC via a PLC interface, according to some embodiments.

At 802, software for performing a software update, such as a software patch for a PLC operating system, a software update for a PLC operating system, or other type of PLC software update, is received by a facility control service. In some embodiments, the software may be received via an API of an interface console or may be received via a web-based interface of an interface console. The interface console may provide an interface to the facility control service to a client of the facility control service.

At 804, instructions for deploying the software may be received at the facility control service. For example, instructions may indicate which PLCs are to be updated, which types of PLCs are to be updated (for example PLCs using a particular PLC protocol, PLCs from a particular vendor, etc.), when the PLCs are to be updated, or a staging sequence for updating the PLCs. In some embodiments, instructions may be submitted or selected by a customer of a facility control service via an interface console, such as an API to the facility service or a web-based interface. In some embodiments, a facility control service may utilize one or more default instructions for performing a software update in the absence of receiving particular instructions for deploying a software update.

At 806, the facility control service, for example via a software update module, coordinates deployment of the PLC software to one or more PLCs according to the deployment instructions.

Figure 9:
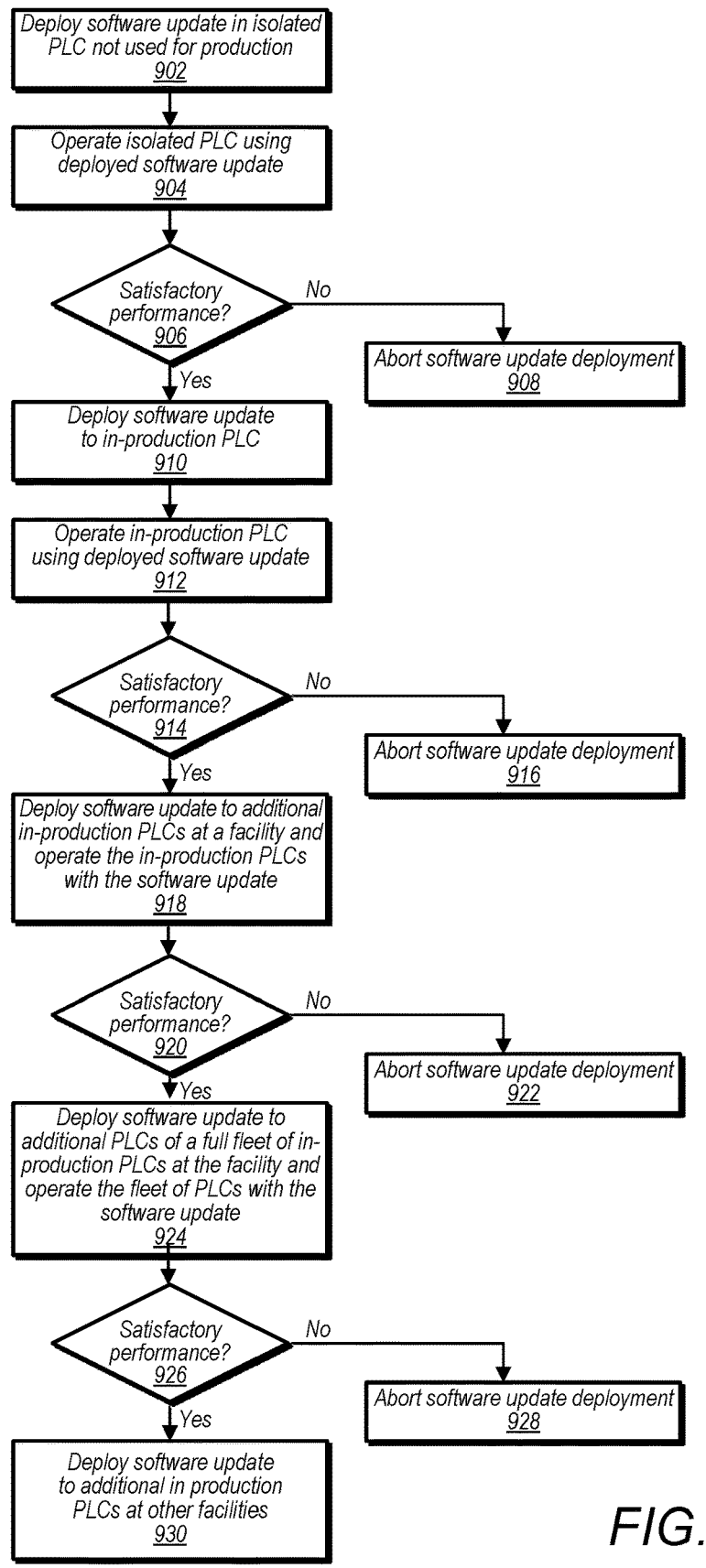
FIG. 9 is a logical block diagram illustrating a staged deployment of a software update/software patch on a fleet of PLCs using a facility control service and PLC interfaces, according to some embodiments.

For example, a staged deployment make proceed in any combination of stages. FIG. 9 provides an example of one of many possible staged deployments of software to a fleet of PLCs using a facility control service.

FIG. 9 is a logical block diagram illustrating a staged deployment of a software update/software patch on a fleet of PLCs, according to some embodiments. In some embodiments, a software update/software patch may update PLC operating system software, PLC control logic software, or PLC interface software.

At 902, software, for example for a PLC operating system update or a patch to a PLC operating system, is deployed to a PLC that is not in production and isolated from other PLCs of a fleet of PLCs at a one or more facilities operated by a facility operator. At 904, the isolated PLC is operated with the updated software deployed on the isolated PLC. Performance of the PLC is tracked and compared to one or more performance thresholds. If after a threshold amount of time, for example 1-2 days, the isolated PLC operates within the one or more performance thresholds and other performances issues are not observed, then the software is deployed on an in production PLC of the facility operator's fleet. For example, at 906, it is determined whether performance of the isolated PLC operating with the software update deployed on it is satisfactory and at 910, in response to determining the isolated PLC is operating satisfactorily, the software is deployed to an in-production PLC. If it is determined that the PLC is not operating satisfactorily, at 908 the software deployment is aborted.

At 912, the in-production PLC with the deployed software update is operated and observed in a similar manner as described at 904 for the isolated PLC. At 914 it is determined if the performance of the in-production PLC operating with the software update deployed on it is satisfactory. If the performance is satisfactory, at 918, the software is deployed to additional in-production PLCs at a same facility as the in-production PLC described at 910-912. If the performance is not satisfactory, the deployment is aborted at 916.

At 920 it is determined if the performance of the multiple in-production PLCs with the software deployed on them is satisfactory. If so, at 924 the software is further deployed to all PLCs at the facility that use a PLC protocol compatible with the software included in the software deployment. If not, at 922, the software deployment is aborted.

At 926, it is determined if the performance of the full fleet of PLCs at the facility operating with the software deployed on them is satisfactory. If so, the software is deployed to PLCs at other facilities at 930. For example, the software deployment may be extended to other facilities operated by the same client of the facility control service as the client that operates the facility in which the software update has already been deployed. At 928, in response to determining the performance of the full fleet of PLCs at the facility operating with the software update deployed is not satisfactory, the software update is aborted.

In some embodiments, various actions may be taken by a facility control service in response to aborting a software deployment. For example, in some embodiments, a facility control service may cause PLCs with the software update already deployed on them to revert back to a state prior to the software update being deployed. Also, a facility control service may issue one or more notifications to a customer in response to aborting a software deployment.

Figure 10:
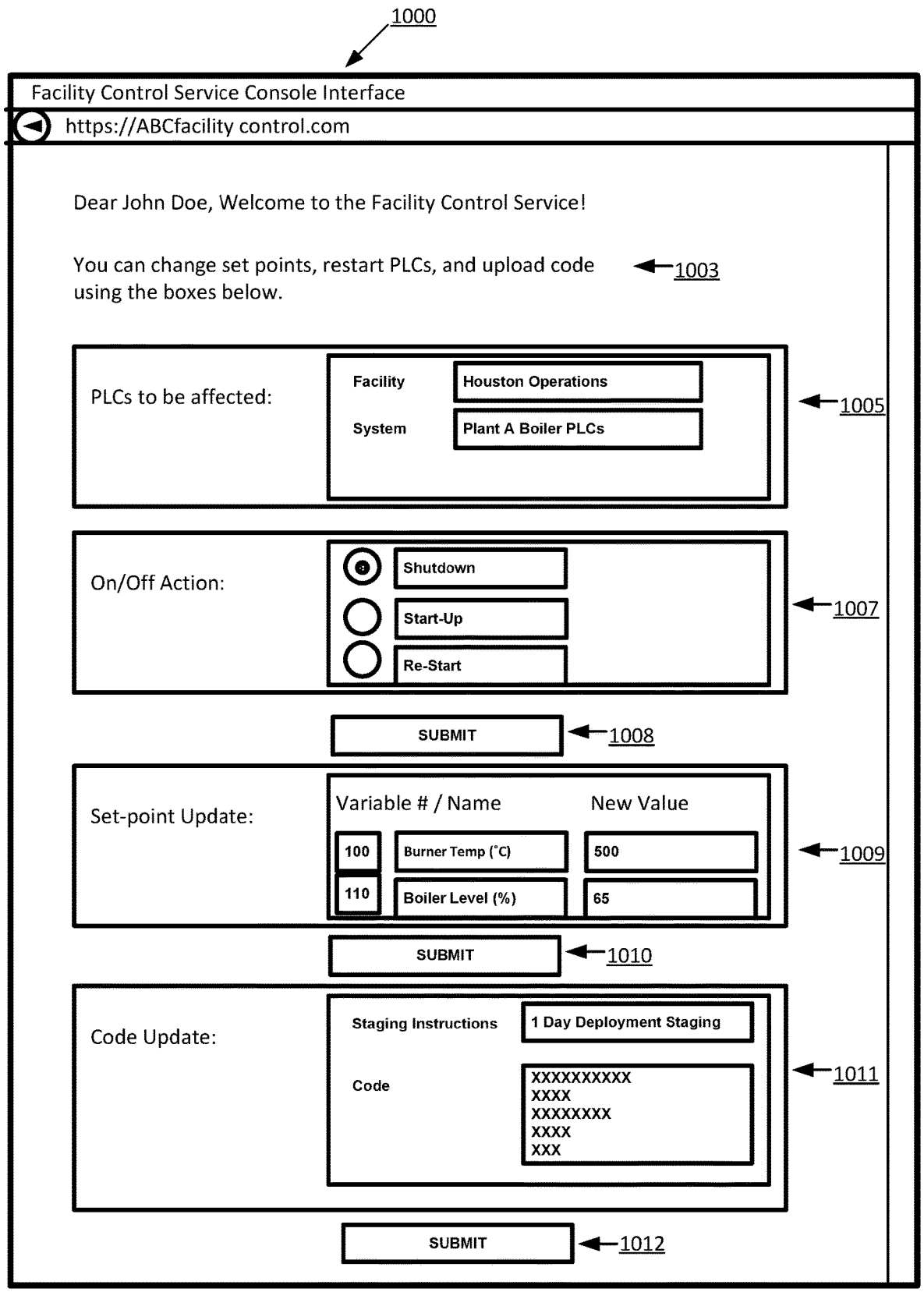
FIG. 10 illustrates an example web-based interface for a facility control system, according to some embodiments.

FIG. 10 illustrates an example web-based interface for a facility control system, according to some embodiments.

In some embodiments, various features described herein in regard to a console interface may be implemented via a web-based interface to a facility control service or via a programmatic interface. FIG. 10 illustrates one example a web-based interface of multiple possible web-based interfaces that may be implemented by or for a facility control service.

Web-based interface 1000 includes instructions 1003 for instructing a customer of a facility control service how to use the web-based interface. In some embodiments, a web-based interface for a facility control service, such as web-based interface 1000, may include a selection mechanism allowing a customer to select one or more particular PLCs or classes of PLCs that are to be affected by control inputs or software inputs submitted via the web-based interface. For example selection mechanism 1005 allows a customer to select PLCs at a facility and/or particular system PLCs at a facility that is to be affected by a control input or a software input. Also a customer may select a particular PLC of a particular system that is to be affected by a control input or a software input. Web-based interface 1000 also includes on/off selector 1007 that allows a customer to select to shutdown, start-up, or restart a PLC or a system associated with a PLC. In addition, web-based interface 1000 includes a submit button 1008 to cause the on/off action selected via on/off selector 1007 to be performed for the PLCs selected in selection mechanism 1005. In some embodiments, a web-based interface, such as web-based interface 1000, may further include a set-point selector, such as set-point selector 1009. In some embodiments, a customer may specify set-points for certain variables controlled by a PLC. For example, set-point selector 1009 indicates a customer setting a variable number 100 for a burner temperature on the Plant A Boiler PLC to 500° C. and setting a variable number 110 for a boiler level on the Plant A Boiler PLC to a 65% level. Web-based interface 1000 also includes a submit button 1010 to cause set-point updates specified in set point selector 1009 to be performed. For example, in response to a customer clicking the submit button 1010, a facility control service may cause the Plant A Boiler PLC to change a burner set point to 500° C. and change a boiler level set point to 65% level.

In some embodiments, a web-based interface may further include a code or software update mechanism. For example, web-based interface 1000 includes code update portion 1011 and code submit button 1012. In some embodiments a customer may submit code for a software update to a PLC operating system, a software patch, or other type of code update via a code update portion, such as code update portion 1011. In some embodiments, a customer may further specify or select staging instructions for deploying the code or software update. For example, staging instructions may include all or a portion of the staging sequences described in FIG. 9, or may include various other staging sequences. In some embodiments, a customer may select from one or more pre-defined staging sequences or may define their own software deployment staging sequence. Once code is added to a code update portion, such as code update portion 1011, a code submit button, such as code submit button 1012 may cause a software or code deployment sequence to begin. For example, in response to a customer clicking code submit button 1012, a facility control service may cause the code included in code update portion to be deployed on the Plant A Boiler PLC at the Houston Operations Facility. The performance of the Plant A Boiler PLC may be monitored over a 1 day staged deployment. Note that various other deployment staging sequences may be used. Also deployment may involve a single PLC, multiple PLCs at a single facility, a full fleet of PLCs at a facility, multiple PLCs at multiple facilities, etc. In some embodiments, a software or code deployment sequence may be scheduled to take place in the future, such that there may be a delay between selecting a code submit button, such as code submit button 1012 and when a software or code deployment sequence begins.

Also, in some embodiments functionality described in regard to web-based interface 1000 may also or alternatively be implemented via a programmatic interface for a facility control service.

In some embodiments, a facility control service may implement a change management procedure that requires changes submitted via a web-based interface to receive one or more approvals, for example from a facility manager, before the changes are implemented.

Figure 11:
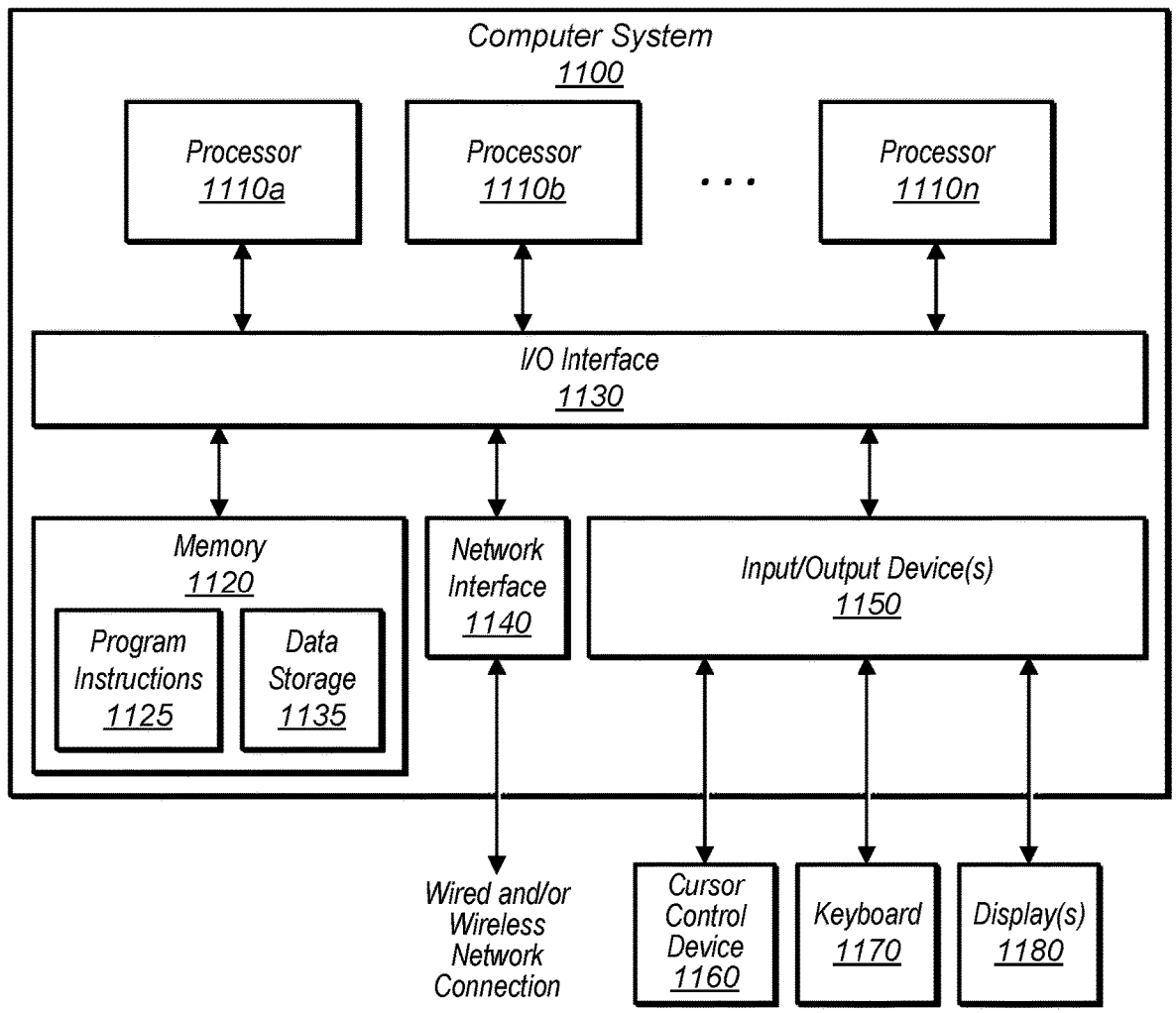
FIG. 11 is a block diagram illustrating an example computer system that implements some or all of the techniques described herein, according to some embodiments.

FIG. 11 is a block diagram illustrating an example computer system that implements some or all of the techniques described herein, according to some embodiments.

Any of various computer systems may be configured to implement processes associated with the provider network 102, facility control service 104, and PLC interfaces, such as any of the PLC interfaces described herein. For example, FIG. 11 is a block diagram illustrating an example computer system that implements some or all of the techniques described herein, according to some embodiments. In various embodiments, the provider network 102, facility control service 104, and PLC interface devices may each include one or more computer systems 1100 such as that illustrated in FIG. 11.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be embedded processors implementing any of a variety of instruction set architectures (ISAs), such as the x106, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the PLC interface, services of the provider network, etc. are shown stored within system memory 1120 as program instructions 1125. In some embodiments, system memory 1120 may include data 1135 which may be configured as described herein (e.g., file objects, log objects, etc.).

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other computer systems 1100 or devices attached to a network, such as the network 110 or a local network within the provider network, for example. In particular, network interface 1140 may be configured to allow communication between computer system 1100 and/or various I/O devices 1150. I/O devices 1150 may include scanning devices, display devices 1180, input devices (e.g. cursor control device 1160 or keyboard 1170) and/or other communication devices, as described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In some embodiments, I/O devices 1150 may be relatively simple or "thin" client devices. For example, I/O devices 1150 may be configured as dumb terminals with display, data entry and communications capabilities, but otherwise little computational functionality. However, in some embodiments, I/O devices 1150 may be computer systems configured similarly to computer system 1100, including one or more processors 1110 and various other devices (though in some embodiments, a computer system 1100 implementing an I/O device 1150 may have somewhat different devices, or different classes of devices).

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A facility control service, comprising:
one or more computers configured to:
  establish an encrypted connection with a programmable logic controller (PLC) interface via an intermediate network in accordance with a secure communication protocol,
    wherein the PLC interface is associated with a particular PLC at a facility, wherein the particular PLC controls a system of the facility;
  provide a certificate to the PLC interface for use in authenticating communications with other PLC interfaces at the facility and a local facility controller at the facility, wherein the PLC interface is configured to exchange data with a computing device implementing the local facility controller at the facility and the other PLC interfaces via a local network at the facility, and wherein the local facility controller is configured to provide uninterrupted control to the particular PLC associated with the PLC interface and other PLCs associated with the other PLC interfaces via the local network when a connection to the facility control service via the intermediate network is unavailable;
  provide another certificate to at least one of the other PLC interfaces at the facility that is associated with another PLC that controls another system of the facility, wherein the other certificate is for use in authenticating communications with the PLC interface and the local facility controller at the facility,
    wherein to exchange data with the a least one other PLC interface, the PLC interface is configured to provide the received certificate for authentication, and
    wherein to exchange data with the PLC interface, the at least one other PLC interface is configured to provide the received certificate for authentication;
  receive data indicating a condition at the facility;
  generate a control command based on the received data to adjust a control parameter of the PLC that controls the system at the facility; and
  cause the control command to be transmitted to the PLC interface in accordance with the secure communication protocol via the encrypted connection over the intermediate network,
    wherein the PLC interface receives the control command formatted in accordance with the secure protocol and converts the control command into a control command in accordance with a PLC protocol in use by the PLC, wherein the converted control command causes the PLC to change the control parameter of the PLC, and wherein to convert the control command, the PLC interface selects PLC conversion instructions for the PLC protocol in use by the PLC from a plurality of PLC conversion instructions for a plurality of PLC protocols; and
    wherein the PLC interface provides the control command to the local facility controller at the facility via the local network to cause the local facility controller to be updated based on the control command.

2. The facility control service of claim 1, wherein the one or more computers are further configured to:
  establish another encrypted connection with another PLC interface in accordance with the secure communication protocol, wherein the other PLC interface is associated with another particular PLC at another facility, wherein the other particular PLC controls a system of the other facility;
  receive data indicating a condition at the other facility;
  generate another control command based on the received data about the other facility to change a control parameter of the other PLC that controls the system at the other facility; and
  cause the other control command to be transmitted to the other PLC interface in accordance with the secure communication protocol via the other encrypted connection,
  wherein the facility and the other facility are remote from one another and remote from the control service.

3. The facility control service of claim 2, wherein a PLC protocol in use by the other PLC at the other facility and the PLC protocol in use by the PLC at the facility are different PLC protocols, and
  wherein the PLC interface at the other facility receives the other control command formatted in accordance with the secure protocol and converts the other control command into a control command in accordance with the PLC protocol in use by the PLC at the other facility.

4. The facility control service of claim 1, wherein the one or more computers are further configured to:
  cause a software update to be transmitted to the PLC interface via the encrypted connection,
  wherein the PLC interface receives the software update and causes the software update to be performed.

5. The facility control service of claim 1, wherein the one or more computers are further configured to:
  provide the received data indicating a condition at the facility to one or more other computers that implement a machine learning service; and
  receive a control recommendation from the machine learning service, the control recommendation determined based, on the provided data indicating the condition at the facility,
  wherein the control command is generated based on the control recommendation from the machine learning service.

6. The facility control service of claim 1, wherein the one or more computers are further configured to:
  provide computing instructions for implementing the PLC interface at the facility,
  wherein the computing instructions when executed by a computing device at the facility or when executed by the PLC at the facility, cause the PLC interface to be implemented at the facility.

7. A method comprising:
  establishing a secure connection between a control service and a programmable logic controller (PLC) interface in accordance with a secure communication protocol,
  wherein the PLC interface is associated with a PLC at a facility, and providing a certificate to the PLC interface for use in authenticating communications with other PLC interfaces at the facility and a local facility controller at the facility, wherein the PLC interface is configured to exchange data with a computing device implementing the local facility controller at the facility and the other PLC interfaces via a local network at the facility, and wherein the local facility controller is configured to provide uninterrupted control to the PLC associated with the PLC interface and other PLCs associated with the other PLC interfaces via the local network when a connection to the control service via the intermediate network is unavailable;

providing another certificate to at least one of the other PLC interfaces at the facility, wherein the other certificate is for use in authenticating communications with the PLC interface and the local facility controller at the facility, wherein to exchange data with the a least one other PLC interface, the PLC interface is configured to provide the received certificate for authentication; and wherein to exchange data with the PLC interface, the at least one other PLC interface is configured to provide the other certificate for authentication;

generating a command to change a parameter of the PLC at the facility;

transmitting the command from the control service to the PLC interface in accordance with the secure communication protocol via the encrypted connection over the intermediate network;

converting, by the PLC interface, the command into a command in accordance with a PLC protocol in use by the PLC at the facility, wherein said converting comprises selecting PLC conversion instructions for the PLC protocol in use by the PLC at the facility from a plurality of PLC conversion instructions for a plurality of PLC protocols stored in a PLC protocol conversion instructions depository of the PLC interface or of the control service; and causing the control command to be provided to the local facility controller via the local network to cause the local facility controller to be updated based on the command from the control service.

8. The method of claim 7, further comprising:
receiving, via the secure connection between the control service and the PLC interface, data indicating a condition at the facility.

9. The method of claim 8, further comprising:
performing machine learning analysis, based on the received data indicating the condition at the facility to determine a control recommendation,
wherein the command to change the parameter of the PLC is determined based on the control recommendation.

10. The method of claim 7, wherein the secure protocol comprises:
an authentication mechanism enabling the PLC interface to authenticate an identity of the control service; and
an encryption mechanism encrypting communications between the PLC interface and the control service.

11. The method of claim 7, wherein the command to change the parameter of the PLC at the facility comprises an instruction to update software operating on the PLC, the method further comprising:
causing a software update to be performed.

12. The method of claim 7, further comprising:
establishing other secure connections between the control service and the other PLC interfaces in accordance with the secure communication protocol;
generating other commands to change parameters of the other PLCs; and transmitting the commands from the control service to the other PLC interfaces in accordance with the secure communication protocol via the other encrypted connections.

13. The method of claim 12, wherein the command to change the parameter of the PLC at the facility and the other commands to change the parameters of the other PLCs comprise instructions to update software operating on the PLC and to update software operating on the other PLCs, the method further comprising:
causing software on a first one of a group of PLCs comprising the PLC and the other PLCs to be updated; and
in response to determining the PLC with the updated software is operating within threshold limits, causing software on another one of the group of PLCs to be updated.

14. The method of claim 7, further comprising:
providing computing instructions for implementing the PLC interface on a computing device at the facility or on the PLC at the facility.

15. The method of claim 7, further comprising:
providing a web-based interface for the control service configured to receive control inputs or software update inputs;
wherein the command to change a parameter of the PLC at the facility is determined based on a control input or a software update input received via the web-based interface for the control service.

16. A non-transitory computer readable storage medium storing program instructions, that when executed by a processor, cause the processor to:
determine a programmable logic controller (PLC) protocol currently in use by a PLC at a facility;
select, from a plurality of PLC protocol conversion instructions stored in a PLC protocol conversion instructions depository, PLC protocol conversion instructions for the PLC protocol in use by the PLC at the facility;
receive, from a control service via an intermediate network, a command formatted in accordance with a secure protocol;
receive, from the control service via the intermediate network, a certificate for use in authenticating communications, via a local network at the facility, with other PLC interfaces for other PLCs at the facility and a local facility controller at the facility;
convert, using the selected PLC protocol conversion instructions, the command into a command in accordance with the PLC protocol in use by the PLC;
cause the converted command to be transmitted to the PLC, wherein the converted command causes the PLC to change a parameter of the PLC; and
cause the control command to be provided to the local controller via the local network to update the local controller, wherein the local controller is configured to provide uninterrupted control to the PLC and the other PLCs at the facility via the local network when a connection to the control service via the intermediate network is unavailable;
exchange data indicating a condition at the facility or data indicating a control parameter of the PLC with the other PLCs at the facility via the local network, wherein each of the other PLCs has an associated PLC interface,
wherein to exchange the data with the other PLCs at the facility via the local network the program instructions cause the data to be transmitted to a local facility control module of the local controller that performs:
- authentication of an identity of a PLC interface that is providing the data based on a first certificate provided by the control service to the PLC interface that is providing the data; and
- authentication of another PLC interface that is receiving the data based on another certificate provided by the control service to the PLC that is receiving the data.

17. The non-transitory computer readable storage medium of claim 16, wherein the program instructions when executed by the processor, further cause the processor to:
cause data indicating a condition at the facility to be transmitted to the control service in accordance with the secure protocol.

18. The non-transitory computer readable storage medium of claim 16, wherein exchanging the data indicating the condition at the facility or the data indicating the control parameter of the PLC with the other PLCs at the facility via the local network comprises the PLC interface providing the data publishing the data to the other ones of the PLCs at the facility that have subscribed to receive those types of information from the PLC interface that provides the data.

19. The non-transitory computer readable storage medium of claim 18, wherein exchanging the data indicating the condition at the facility or data indicating the control parameter of the PLC with other PLCs at the facility via the local network comprises the PLC interface that receives the data, receiving types of information from other PLC interfaces for the other PLCs at the facility to which the PLC interface that receives the data has made a subscription.

20. The non-transitory computer readable storage medium of claim 16, wherein the secure protocol comprises:
- an authentication mechanism enabling authentication of the control service; and
- an encryption mechanism encrypting communications with the control service.

\* \* \* \* \*